US007631142B2

(12) United States Patent  (10) Patent No.: US 7,631,142 B2
Nishide et al.  (45) Date of Patent: Dec. 8, 2009

(54) METHOD AND APPARATUS FOR SELECTIVELY STORING DATA INTO CACHE OR NONVOLATILE MEMORY

(75) Inventors: Koichi Nishide, Tachikawa (JP); Yoriharu Takai, Kodaira (JP); Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 11/783,828

(22) Filed: Apr. 12, 2007

(65) Prior Publication Data

US 2007/0255898 A1  Nov. 1, 2007

(30) Foreign Application Priority Data

Apr. 28, 2006  (JP)  ............................. 2006-126855

(51) Int. Cl.
*G06F 12/00*  (2006.01)
(52) U.S. Cl. ...................................... 711/113; 711/103
(58) Field of Classification Search ........................ None
See application file for complete search history.

(56) References Cited

U.S. PATENT DOCUMENTS

| 4,574,346 A | 3/1986 | Hartung |
| 4,638,425 A | 1/1987 | Hartung |
| 5,581,726 A | 12/1996 | Tanaka |
| 5,956,268 A * | 9/1999 | Lee ........................ 365/185.03 |
| 6,418,510 B1 | 7/2002 | Lamberts |
| 2004/0193782 A1 * | 9/2004 | Bordui ........................ 711/103 |
| 2006/0080501 A1 | 4/2006 | Auerbach et al. |
| 2008/0114930 A1 * | 5/2008 | Sanvido et al. ............... 711/113 |

FOREIGN PATENT DOCUMENTS

| JP | 07-121444 | 5/1995 |
| JP | 08-171515 | 7/1996 |
| JP | 3407317 B2 | 3/2003 |
| JP | 2004-055102 | 2/2004 |
| JP | 2006-114206 | 4/2006 |
| WO | WO 2005/022550 | 3/2005 |

OTHER PUBLICATIONS

Chinese Office Action dated Aug. 1, 2008 for Appln. No. 2007100964153.

* cited by examiner

*Primary Examiner*—Than Nguyen
(74) *Attorney, Agent, or Firm*—Pillsbury Winthrop Shaw Pittman, LLP

(57) ABSTRACT

A write medium is selected so as to realize the fastest operation after data including a write command has been received from the host device. A storage device comprises a host interface, a cache memory interface, a hard disk interface, a flash memory interface, a command analyzing section which analyzes the contents of a command inputted from the host interface, a state determining section which determines into which of the cache memory and flash memory data can be written faster based on the relationship between the write data size and the free space of the cache memory if the command analyzed in the command analyzing section is a write command, and a media selecting section which determines a data write destination according to the determination result of the state determining section.

10 Claims, 4 Drawing Sheets

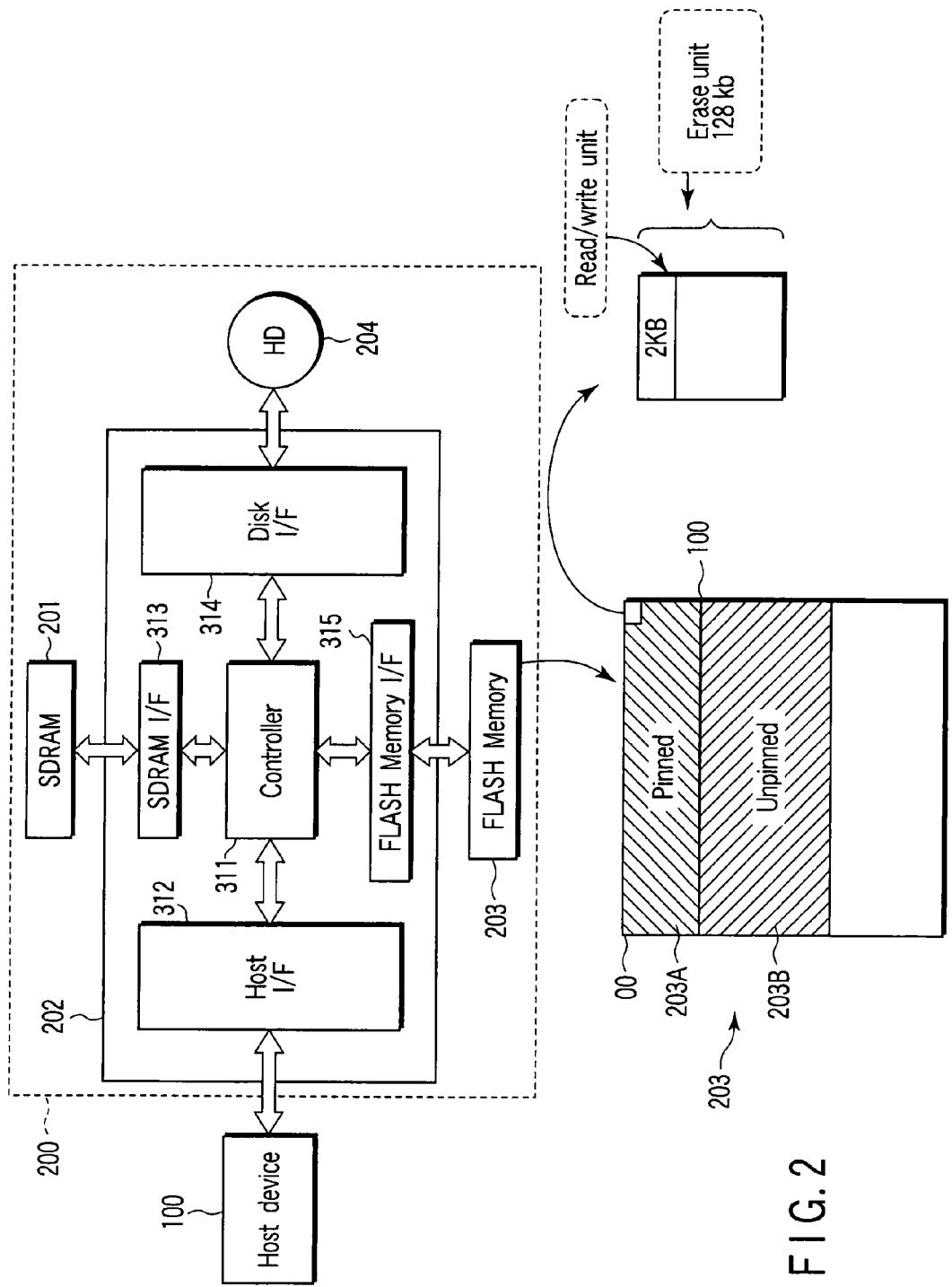
F I G. 2

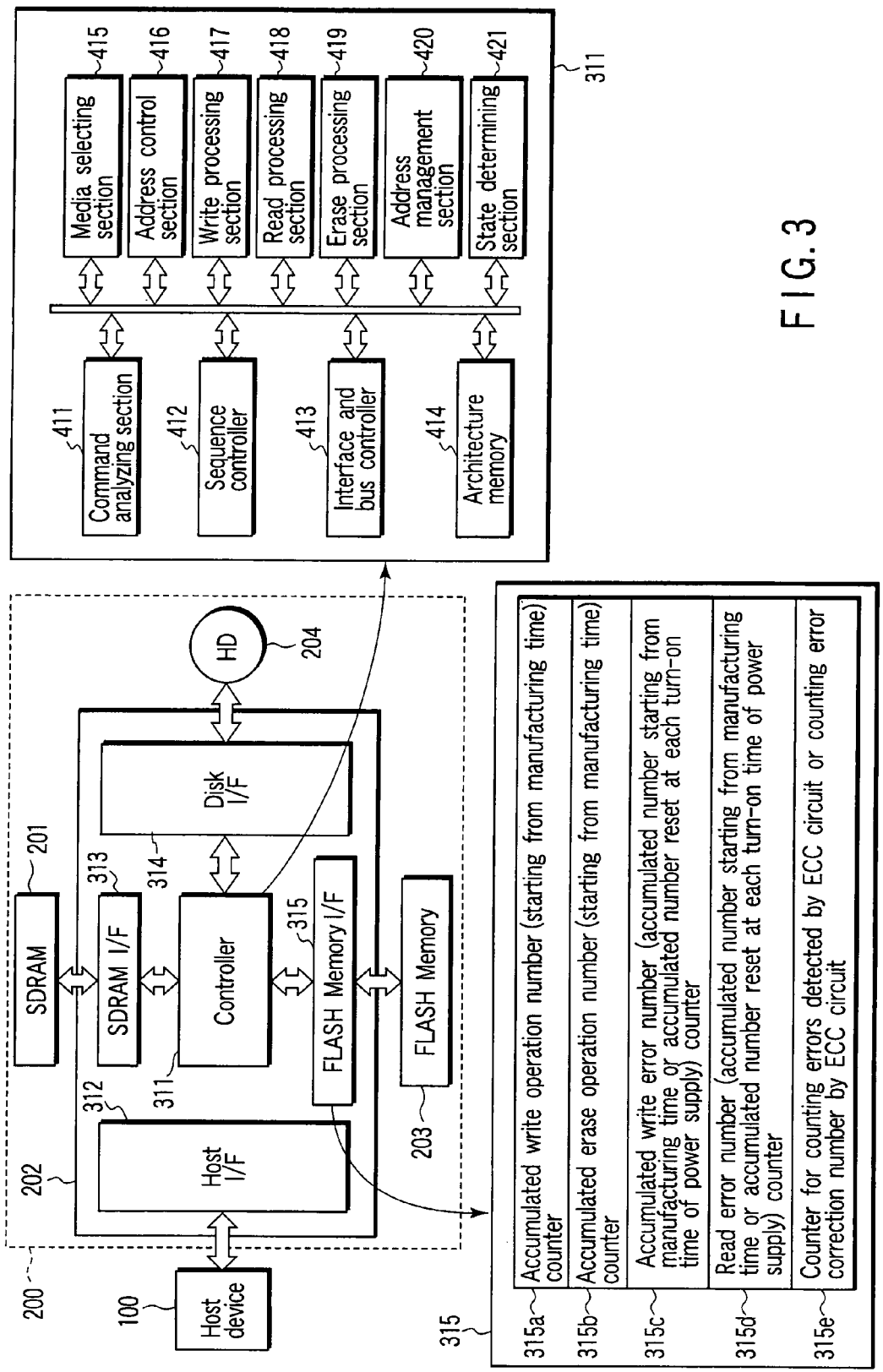
F I G. 3

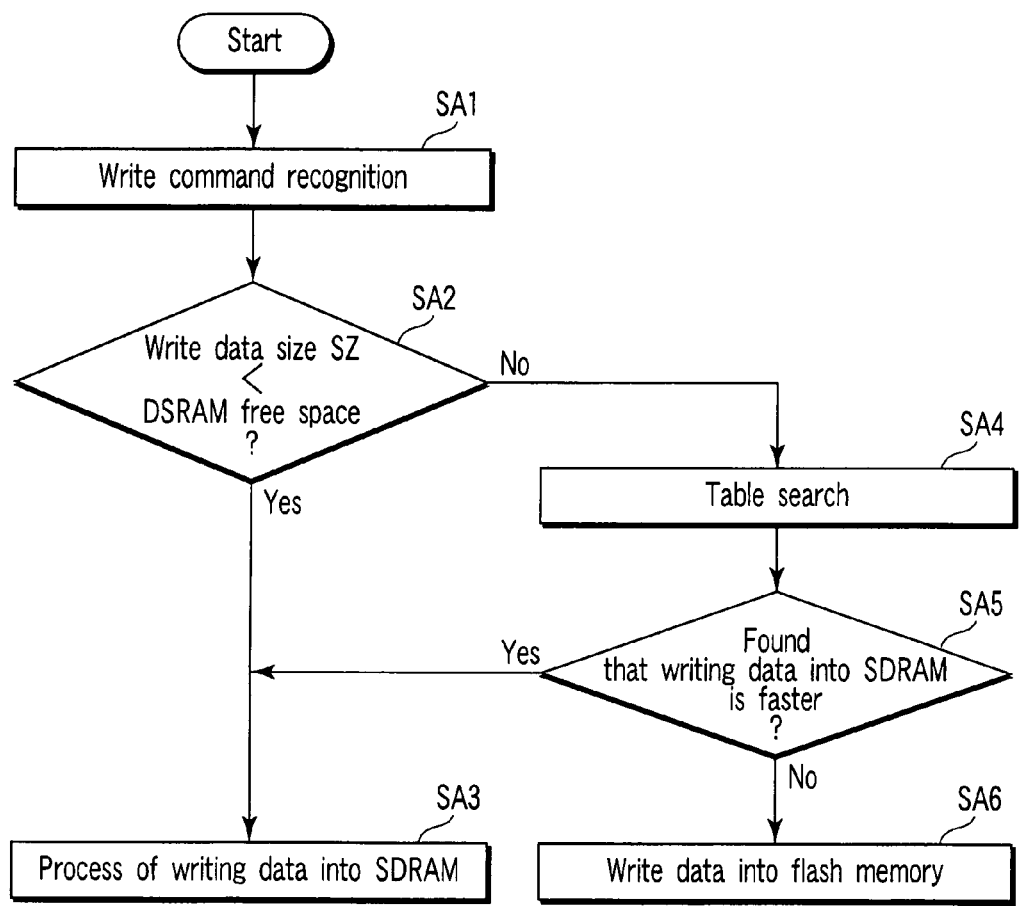
F I G. 4

METHOD AND APPARATUS FOR SELECTIVELY STORING DATA INTO CACHE OR NONVOLATILE MEMORY

CROSS-REFERENCE TO RELATED APPLICATIONS

This application is based upon and claims the benefit of priority from Japanese Patent Application No. 2006-126855, filed Apr. 28, 2006, the entire contents of which are incorporated herein by reference.

BACKGROUND

1. Field

One embodiment of the invention relates to a storage device using a nonvolatile flash memory and a control method thereof, and the storage device is configured to be able to realize the fastest response speed with which notice of a data write command (write command) received from a host device having been executed is given to the host device.

2. Description of the Related Art

In recent years, a storage device on which both of a memory card which is a semiconductor storage medium and a hard disk (HD) drive using a hard disk which is a magnetic storage medium can be mounted is developed (refer to Jpn. Pat. Appln. KOKAI Publication No. 2004-055102). For example, data of the memory card fetched from the exterior can be backed up into the hard disk (HD) which is a magnetic storage medium. Further, data of a hard disk (HD) can be transferred to the memory card and can be thus taken out.

As a mobile storage device, a storage device using a flash memory is developed (refer to Japanese Patent Publication No. 3407317). A large number of errors occur in the flash memory when the number of erase operations of the flash memory becomes large (for example, 100,000 times), and therefore, an attempt is made to solve the above problem. For example, a data management method for suppressing the number of erase operations for a specified area from becoming larger is provided.

As described above, there are devices using a plurality of various types of recording media. However, when data including a write command has been supplied from the host device, it is important to determine into which recording medium the data can be written. A method of selecting a recording medium as a write destination has much influence on the overall data processing speed.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 2 is a diagram for illustrating the feature of a flash memory shown in FIG. 1.

FIG. 3 is a diagram for illustrating the functions of a flash memory interface and controller 311 shown in FIG. 1.

FIG. 4 is a flowchart for illustrating one example of the operation of a device shown in FIG. 1.

DETAILED DESCRIPTION

Figure 1:
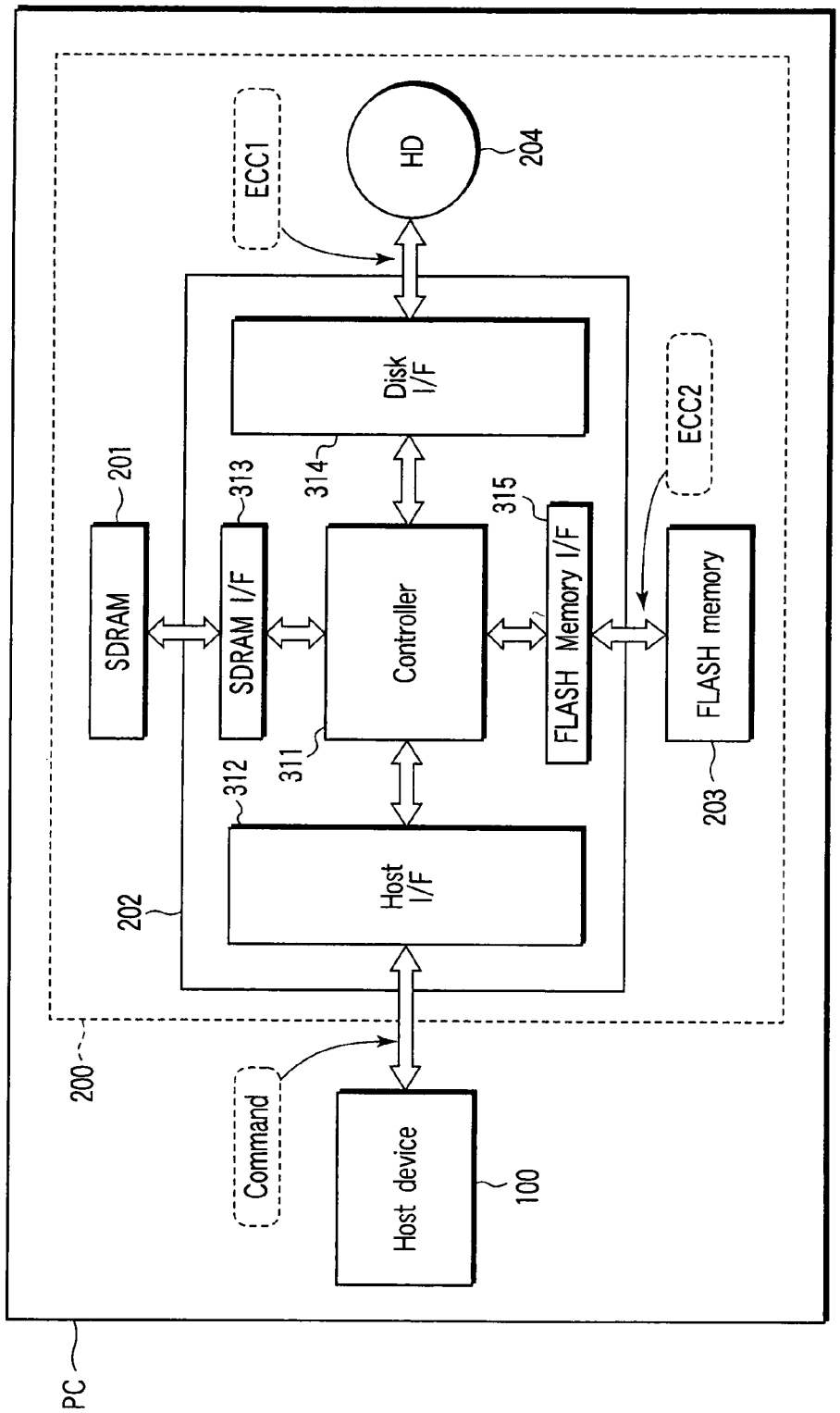
FIG. 1 is a block diagram showing the whole configuration of one embodiment according to the present invention.

Various embodiments according to the invention will be described hereinafter with reference to the accompanying drawings.

One embodiment of this invention comprises a host interface, a cache memory interface acting as an interface to a cache memory, a hard disk interface acting as an interface to a hard disk, a flash memory interface acting as an interface to a flash memory, a command analyzing section which analyzes a command inputted from the host interface, a state determining section which determines into which of the cache memory and flash memory data can be written faster based on the relationship between the write data size and the free space of the cache memory if the command analyzed in the command analyzing section is a write command, and a media selecting section which determines a data write destination according to the determination result of the state determining section.

In this manner, when data including a write command has been supplied from the host device, it is determined into which of the cache memory and flash memory the data can be written faster, thereby realizing data writing with higher speed.

<Whole Configuration and Function>

First, one example of a whole block of one embodiment is explained with reference to FIG. 1. A reference symbol 100 denotes a host device which is a control section in a personal computer, for example. A reference symbol 200 denotes a storage device using a nonvolatile cache memory. The storage device 200 includes an SDRAM 201 functioning as a buffer (also referred to as a cache memory), for example, one-chip large-scale integrated circuit (LSI) 202 on which a controller and the like which will be described later are mounted, flash memory 203, and a hard disk (HD) 204 being drove by a hard disk driver (not shown).

The LSI 202 includes a controller 311, host interface 312, SDRAM interface (also referred to as a cache interface) 313, disk interface 314 and flash memory interface 315. The SDRAM 201 may be contained in the LSI 202. Further, not only the SDRAM 201, but also both of the flash memory 203 and SDRAM 201 or only the flash memory 203 may be contained in the LSI 202.

The host device 100 can supply a command to the controller 311 via the host interface 312. Further, the host device 100 can receive data from the controller 311 via the host interface 312 and transfer data to the controller 311 side.

Commands supplied from the controller 311 include a data write command, data read command, data size specifying command, data transferring command, memory command and a command for reading information. The controller 311 interprets the command from the host device 100 and performs the data write process, read process and transfer process.

The controller 311 can transfer data with respect to the SDRAM 201 via the SDRAM interface 313. Further, the controller 311 can transfer data with respect to the HD 204 via the disk interface 314. In addition, the controller 311 can transfer data with respect to the flash memory 203 via the flash memory interface 315. Data to be stored in the flash memory 203 is stored after an error correction code is added thereto. In addition, for a flash memory having an incorporated ECC processing function, no ECC circuit is required on the LSI side.

Data to be stored in the hard disk is stored after an error correction code is added thereto. An ECC process is performed with respect to recording data into the flash memory and recording data into the hard disk so that an error correcting process can be performed at the reproduction time.

The above apparatus uses portions of the SDRAM 201, SDRAM interface 313, flash memory interface 315 and flash memory 203 as a cache.

The data writing sequence and data reading sequence are determined according to software stored in the controller 311. For example, when write data is transferred from the host device 100 to the hard disk 204, the data may be transferred via the following paths:

(a1) Path of host interface 312→controller 311→SDRAM interface 313→SDRAM 201→SDRAM interface 313→controller 311→disk interface 314→hard disk 204;

(a2) Path of host interface 312→controller 311→flash memory interface 315→flash memory 203→flash memory interface 315→controller 311→disk interface 314→hard disk 204;

(a3) Path of host interface 312 →controller 311→flash memory interface 315→flash memory 203 flash memory interface 315→controller 311→SDRAM interface 313→SDRAM 201→SDRAM interface 313→controller 311→disk interface 314 →hard disk 204; and (a4) Path of host device→controller 311→SDRAM interface 313 →controller 311→flash memory 203→controller 311→HD 204 through corresponding interfaces.

When data is read from the hard disk 204 to the host device 100, the data may be read via the following paths:

(1) Path of disk interface 314→controller 311→SDRAM interface 313→SDRAM 201→SDRAM interface 313→controller 311→host interface 312→host device;

(2) Path of disk interface 314→controller 311→flash memory interface 315→flash memory 203→flash memory interface 315→controller 311→host interface 312→host device;

(3) Path of disk interface 314→controller 311→flash memory interface 315→flash memory 203→flash memory interface 315→controller 311→SDRAM interface 313→SDRAM 201→SDRAM interface 313→controller 311→host interface 312→host device;

(4) Path of disk→SDRAM→flash memory host device through corresponding interfaces; and (5) Path of disk→SDRAM→flash memory→SDRAM→host device.

<Explanation for Flash Memory>

FIG. 2 is a diagram for illustrating the characteristic control operation in dealing with the flash memory 203. The flash memory 203 is a nonvolatile memory, but data can be electrically erased. Therefore, it is a data rewritable nonvolatile memory.

For example, the erase unit of the flash memory 203 is specified as 128 Kbytes. Further, the reading unit and writing unit are specified as 2 Kbytes, for example. The elements of the flash memory 203 are degraded and the number of errors increases with an increase in the number of erase operations. Therefore, as information which ensures the performance of the element, the number of rewriting times is limited to approximately 100,000 times. The number of bytes of the erase unit and the values of the writing unit are not limited to the above. For example, the erase unit may be set to 32 Kbytes and the reading/writing unit may be set to 512 units.

<Basic Relation between Flash Memory, Controller and Command from Host Device>

As shown in FIG. 2, when data is written into the flash memory 203, the write area can be divided into areas which are called a pinned area 203A and unpinned area 203B. The pinned area 203A is an area which is formed when a data write destination-indicating command supplied from the host device 100 specifies the flash memory 203. The command contains a logical block address (LBA) of the flash memory 203. The unpinned area 203B is an area which is formed when a data write destination-indicating command from the host device 100 is not specified and in which data transferred according to independent determination by the controller 311 is stored.

As data written into the flash memory 203, data supplied from the host device 100 or data read from the hard disk 204 is provided.

Various types of determination conditions for determining a data write destination by the controller 311 are provided. The state determining section of the controller 311 synthetically judges the conditions of the surroundings and determines the write destination.

<Case of Storing Data from Host Device 100 in Flash Memory 315 or SDRAM 201>

This condition occurs immediately after the power supply of the device is turned on and when the hard disk of the HD 204 does not reach the predetermined number of rotations or when the HD 204 is set in a stopped state. In this case it is more convenient to write the data into the flash memory 315 or SDRAM 210. Further, when rapid data transfer is desired, it is convenient that the data is once written from the host device 100 into the flash memory 315 and then the data is transcribed (referred to as "write back") to the HD 204 when there is enough time.

<Case in which Host Device 100 Desires to Use Data of HD 204 Iteratively>

In this case, it is convenient to read the data of the HD 204 and store it in the flash memory 315. If the data to be used is stored in the flash memory 315, high-speed access to the data is enabled.

<Function and Configuration of Flash Memory Interface 315 and Controller 311>

FIG. 3 shows the configurations of the controller 311 and flash memory interface 315 classified according to respective functions. An accumulation counter is provided in the flash memory interface 315, the count value thereof is written into a register provided in the interface, for example, and then written into the flash memory 203 or the flash memory 203 may be directly utilized.

As the counter, an accumulated write operation number counter 315$a$, accumulated erase operation number counter 315$b$, accumulated write error number counter 315$c$ and read error number counter 315$d$ are provided. Instead of the read error number counter 315$d$, an error number counter for counting errors detected by an ECC circuit or an error correction number counter 315$e$ may be provided. Further, a counter which counts the reading/writing unit may be provided. The contents of the counters are used as the determination factors of the state determining section which determines whether warning is issued when the number of errors becomes larger.

The controller 311 includes a command analyzing section 411 to decode and analyze a command supplied from the host device 100. It specifies software in an architecture memory 414 based on the analysis result of the command and sets an operation sequence in a sequence controller 412. Further, the command analyzing and control operation can be performed in the interface 312.

The sequence controller 412 controls the flow of data and control data via an interface and bus controller 413. For example, when the data write or read operation is performed, a media selecting section 415 specifies an SDRAM 201, flash memory 203 or hard disk (HD) 204 and an address control section 416 specifies a write address or read address. Then, at the data write time, a write processing section 417 performs a write data transfer process or the like. Further, at the data read time, a read processing section 418 performs a read data transfer process or the like.

In addition, an erase processing section 419 is provided. The erase processing section 419 performs the erase process for data of the SDRAM 201 and flash memory 203. Further, the erase processing section 419 can perform the erase process for data of the hard disk 204.

In addition, an address management section 420 is provided. The address management section 420 collectively manages addresses of the SDRAM 201, addresses of the hard disk 204 and addresses of the recorded area and unrecorded area of the flash memory 203.

Since the flash memory 203 is used as a cache memory, it is not necessary to pay attention to the address of the cache memory and set the address of the hard disk 204 side when the host device 100 side specifies the address. When a cache memory is particularly specified as a data storage destination, a pinned command may be issued. If a pinned command is not provided, the data storage destination depends on the determination result of the firmware configured in the controller 311. That is, in order to write the data positively into the flash memory 203, an LBA is specified in particular. This address specifies the pinned area described above and is referred to as a pinned LBA. A group of addresses not specified by the host device is referred to as an unpinned LBA.

The address management and control operation for the pinned area and unpinned area of the flash memory 203 may be performed in the interface 315.

Further, a state determining section 421 is provided. The state determining section 421 monitors the state of the storage medium, state of the remaining free space and state of the hard disk 204.

When the storage capacity of the flash memory 203 becomes larger than a certain threshold value, the controller 311 determines the state and performs a process of transferring and writing data into the hard disk 204. The operation performed at this time is mainly controlled by a combination of the read processing section 418, write processing section 416 and address management section 420.

<Characteristic Configuration, Function and Operation in Present Embodiment>

In the above storage device, if a logical block address (LBA) for writing data is not specified when data including write command has been supplied from the host device 100, it is committed to the determination (software) of the controller 311 into which medium the data is to be written.

Here, the flash memory 203 is a NAND flash memory. Usually the data write speed into the SDRAM 201 is larger than that into the flash memory 203. Therefore, if a write command is issued out of range of the pinned LAB from the host device 100, the storage device is designed to perform the following processing procedures:

(A) If the cache memory (SDRAM) has a large free space, data is first written into the SDRAM 201. Thus, the data flows via a path of host device 100→controller 311→SDRAM 201 and is once cached. Subsequently, the data is written back via a path of SDRAM 201→controller 311→HD 204.

(B) If the cache memory (SDRAM) has a small free space, data is first written into the flash memory 203. Thus, the data flows via a path of host device 100→controller 311→flash memory 203 and is once cached. Subsequently, the data is written back via a path of flash memory 203→controller 311→HD 204.

(C) In addition thereto, wherever data is transferred, the data may flow once via the SDRAM 201.

<Determination Method for the Size of SDRAM Free Space Used as Criteria for Write Destination>

(1) The address of the SDRAM 201 is managed in units of write data size and read data size by the address management section 420. Accordingly, after a write command has been supplied, the address management section 420 indicates that the SDARM 201 has free space and the space is larger than the write data size, the media selecting section 415 selects the SDRAM 201 as a data write destination. The write data size is transferred thereto with the write command.

(2) Case in which when a write command has been supplied from the host device 100, the data of the SDRAM 201 is being transferred to the HD 204 although the free space of the SDRAM 201 is smaller than the write data size. In this case, the switchover of the write destination to the flash memory 203 is conceivable, however, it may be more advantageous to wait until a sufficient free space is created in the SDRAM 201. That is, the time until the completion of the processing may be shorter in the case of waiting until free space is created in the SDRAM 201 to write data into the SDRAM 201 than in the case of writing data into the flash memory 203. In such a case data is written into the SDRAM 201 after the free space of the SDRAM 201 has reached the write data size. In addition to this method, data may be written into the SDRAM immediately after the write command has supplied without waiting for the creation of a sufficient free space in the SDRAM 201 according to the conditions of write data volume, read data volume from the SDRAM, write/read transfer speed and free space of the SDRAM. This processing method will be described later.

When waiting until the free space of the SDRAM 210 reaches the write data size, the write destination is determined according to the write data size. That is:

(2-1) If the clock frequency of the flash memory and the write data size SZ are known, the time for writing the data into the flash memory 203 (T1) is known;

(2-2) If the clock frequency of the SDRAM and the write data size SZ are known, the time for writing the data into the SDRAM 202 (T2) can be known;

(2-3) The time (t1) for creating a free space corresponding to the data size SZ is equal to the time required for reading the data of (Sz−sz1) assuming that the current free space of the SDRAM is sz1. The free space sz−1 is always comprehended by the address management section 420;

(2-4) Accordingly, the time until the completion of writing of the write data of size SZ into the SDRAM 202 is given by (T2+t1);

(2-5) Here, it is found out that writing data into the SDRAM 202 is more advantageous in a case of (T1)>(T2+t1);

(2-6) Thus, variations of (T2+t1) can be calculated in advance with the sz1 as a variable value for a plurality of values or a plurality of ranges of the parameter SZ respectively. Thereby a pair of SZ and sz1 yielding (T1)>(T2+t1) can be found. This pair of Sz and sz1 is stored in a table; and (2-7) Using the table, the write destination can be determined as the SDRAM 202 immediately according to the write data size SZ and remaining free space sz1. In this case table reference time t2 is further added to (T2+t1).

(3) Case in which when a write command has been supplied from the host device 100, the data of the SDARM 201 is being transferred to the HD 204 although the free space of the SDRAM 201 is smaller than the write data size. In this case the switchover of the write destination to the flash memory 203 is conceivable, however, data may be written into the free space created in the SDRAM 201. That is:

(3-1) This is a case in which the write address and read address are spaced sufficiently from each other and the free space of the SDRAM 201 is substantially as large as the write data size. Alternatively, a case in which the write data size is small. In such a case, the read/write of data from/into the SDRAM 201 is performed by time-sharing, data writing may have been completed until the write address catches up with the read address. The determination of the write destination at this time is made by referencing to the table of the pair SZ and sz1 calculated in advance, as described in (2-1) to (2-7).

The descriptions of the above (1), (2) and (3) are applicable to a case "in which the data writing into the cache memory (SDRAM) 201 is determined to be faster than the data writing into the nonvolatile flash memory 203".

If the above (1), (2) and (3) are not applicable, the state determining section 421 and media selecting section 415 configure the settings for performing data writing into the flash memory 203.

As described above, according to the present storage device and control method, it is determined into which of the SDRAM 201 and flash memory 315 data can be written faster when data including a write command has been supplied from the host device 100. Thereby fast data writing is realized, and a response of writing completion is sent to the host device 100 when the data writing is completed. As a result, the data processing can be speeded up as a whole.

FIG. 4 is a flowchart illustrating the descriptions of operations described above as a whole. That is, when a write command is recognized (Step SA1), it is determined whether the free space of the SDRAM 201 can accommodate the write data size SZ (Step SA2). If the free space of the SDRAM 201 is sufficient, data writing into the SDRAM 201 is performed (Step SA3). If the free space of the SDRAM 201 is insufficient, the table search described above is performed (Step SA4). If it is found out that data writing into the SDRAM 201 is faster than that into the flash memory 203, data writing into the SDRAM is performed. In cases other than this, data writing into the flash memory is performed (Step SA6).

In addition, the present invention is not limited to the embodiment as it is, and can be embodied by changing the components thereof without departing the substance in the implementation step. Moreover, by combining a plurality of components disclosed in the embodiment suitably, various inventions can be made. For example, several components may be deleted from all the components described in the embodiment. Further, components of different embodiments may be combined suitably.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device using a nonvolatile flash memory, comprising:
    a host interface;
    a cache memory interface acting as an interface to a cache memory;
    a hard disk interface acting as an interface to a hard disk;
    a flash memory interface acting as an interface to a flash memory;
    a command analyzing section analyzing a command inputted from the host interface;
    a state determining section determining into which of the cache memory and flash memory data can be written faster based on the relationship between the write data size and the free space of the cache memory if the command analyzed in the command analyzing section is a write command; and
    a media selecting section determining a data write destination according to the determination result of the state determining section.

2. The storage device using the nonvolatile flash memory according to claim 1, wherein
    the state determining section gives a write processing section an instruction to write data into the cache memory when the free space is larger than the data size (SZ) of the write data.

3. The storage device using the nonvolatile flash memory according to claim 1, wherein
    the state determining section waits until free space for the write data size (SZ) is created in the cache memory to give an instruction to write data into the cache memory when the free space is smaller than the data size (SZ) of the write data, but when data is being read from the cache memory.

4. The storage device using the nonvolatile flash memory according to claim 3, wherein
    when the relationship among the time for writing the write data into the flash memory (T1), the time for writing the write data into the cache memory (T2) and the waiting time until the free space has been created (t1) is given by (T1)>(T2+t1), the state determining section 421 gives an instruction to write data into the cache memory.

5. The storage device using the nonvolatile flash memory according to claim 1, wherein
    the state determining section gives an instruction to write the write data into the cache memory when the free space is smaller than the data size (SZ) of the write data, but when data is being read from the cache memory and the data size is substantially as large as the free space.

6. A control method of a storage device comprising a host interface to/from which commands and data from the host device is inputted/outputted, a command analyzing section, a cache memory interface for a cache memory, a flash memory interface for a flash memory and a disk interface inputting/outputting data to/from the hard disk and performing a data processing using the cache memory, the method comprising:
    analyzing a command in the command analyzing section;
    determining into which of the cache memory and flash memory data can be written faster based on the relationship between the write data size and the free space of the cache memory if the command analyzed in the command analyzing section is a write command; and
    determining a data write destination according to the determination result of the state determining section.

7. The control method of the storage device according to claim 6, wherein
    in the determination, an instruction to write data into the cache memory is given when the free space is larger than the data size (SZ) of the write data.

8. The control method of the storage device according to claim 6, wherein waiting is performed until free space for the write data size (SZ) is created in the cache memory to give an instruction to write data into the cache memory when the free space is smaller than the data size (SZ) of the write data, but when data is being read from the cache memory.

9. An apparatus using plurality mediums, comprising:
a host device;
a storage device being connected to the host device through a host interface;
a cache memory being connected to the storage device through a cache memory interface;
a hard disk driver being connected to the storage device through a hard disk interface;
a flash memory being connected to the storage device through a flash memory interface;
a command analyzing section being provided in the storage device, analyzing a command inputted from the host interface;
a state determining section being provided in the storage device, determining into which of the cache memory and flash memory data can be written faster based on the relationship between the write data size and the free space of the cache memory, if the command is a write command; and
a media selecting section being provided in the storage device, determining a data write destination according to the determination result of the state determining section.

10. The apparatus using plurality mediums according to claim 9, wherein
the state determining section gives a write processing section an instruction to write data into the cache memory when the free space is larger than the data size (SZ) of the write data.

* * * * *